(12) United States Patent
Gross et al.

(10) Patent No.: US 9,310,541 B2
(45) Date of Patent: Apr. 12, 2016

(54) LAYERED PHOTOCHROMIC COMPOSITION AND DEVICE

(71) Applicant: KiloLambda Technologies Ltd., Tel Aviv (IL)

(72) Inventors: Noam Gross, Kiryat Ono (IL); Ariela Donval, Rosh-Haayin (IL); Ido Dotan, Givataim (IL); Moshe Oron, Rehovot (IL); Doron Nevo, Ra'anana (IL)

(73) Assignee: KILOLAMBDA TECHNOLOGIES LTD, Tel-Aviv (IL)

( * ) Notice: Subject to any disclaimer, the term of this patent is extended or adjusted under 35 U.S.C. 154(b) by 57 days.

(21) Appl. No.: 13/892,901

(22) Filed: May 13, 2013

(65) Prior Publication Data

US 2014/0334026 A1    Nov. 13, 2014

(51) Int. Cl.
*G02B 5/23* (2006.01)
*G02B 5/22* (2006.01)
*G02B 1/04* (2006.01)

(52) U.S. Cl.
CPC ... *G02B 5/23* (2013.01); *G02B 1/04* (2013.01); *G02B 5/22* (2013.01)

(58) Field of Classification Search
CPC ............. G02B 5/22; G02B 5/23; B32B 38/08
USPC ........ 359/885, 887, 890; 351/159.61–159.65, 351/159.6
See application file for complete search history.

(56) References Cited

U.S. PATENT DOCUMENTS

| | | | |
|---|---|---|---|
| 4,268,134 A | 5/1981 | Gulati et al. | |
| 4,300,821 A | 11/1981 | Mignen et al. | |
| 4,845,529 A | 7/1989 | Pearson et al. | |
| 5,112,683 A * | 5/1992 | Johansen | B05B 15/045 427/448 |
| 5,232,637 A | 8/1993 | Dasher et al. | |
| 7,884,992 B1 | 2/2011 | Wang et al. | |
| 2002/0152928 A1* | 10/2002 | Lawandy | B07C 3/18 106/31.13 |
| 2005/0136260 A1 | 6/2005 | Garcia | |
| 2005/0168690 A1* | 8/2005 | Kawai et al. | 351/163 |
| 2011/0116151 A1* | 5/2011 | Rossini | G02B 5/23 359/241 |
| 2011/0255051 A1* | 10/2011 | McCabe et al. | 351/163 |
| 2012/0075577 A1* | 3/2012 | Ishak | G02C 7/10 351/159.29 |
| 2012/0120515 A1* | 5/2012 | Ishak et al. | 359/885 |
| 2012/0287522 A1* | 11/2012 | Ofir | G02B 5/23 359/890 |

FOREIGN PATENT DOCUMENTS

WO  WO 2010/004021 A2   1/2010
WO  WO 2012/170066 A1  12/2012

OTHER PUBLICATIONS

European Search Report in related EP Application No. 14166941.6-1301, mailed Sep. 26, 2014 (6 pages).

* cited by examiner

*Primary Examiner* — Bumsuk Won
*Assistant Examiner* — William R Alexander (57) ABSTRACT

An optical power-limiting passive (self-adaptive) device and method for limiting optical power transmission in lenses and windows, using layers of different photochromic compositions that exploit the full solar ultraviolet (UV) and short visible light spectrum. While a typical single photochromic material is activated by a UV band of wavelengths, e.g. 340 to 380 nm, adding a layer of photochromic material that is activated by an additional band of wavelengths, e.g., 380 to 420 nm, allows the efficient use of a wider band of solar UV and short visible light, e.g., 340 to 420 nm, thus enhancing the photochromic response to solar light.

14 Claims, 6 Drawing Sheets

LAYERED PHOTOCHROMIC COMPOSITION AND DEVICE

FIELD OF THE INVENTION

The present invention relates to optical power-limiting devices, and more particularly, to an optical power-limiting passive (self-adaptive) device and to a method for limiting optical power transmission in lenses and windows, using layers of different photochromic compositions that exploit the full solar ultraviolet (UV) and short visible light spectrum. While a typical single photochromic material is activated by a UV band of wavelengths, e.g. 340 to 380 nm, adding a layer of photochromic material that is activated by a different band of wavelengths, e.g. 380 to 420 nm, allows a broader and more efficient use of the band of solar UV and short visible light e.g. 340 to 420 nm, thus enhancing the photochromic response to solar light. The order of the layers facing the light source is of major importance since each layer attenuates part of the activating solar spectrum that reaches the proceeding layers. An optimal sequence of layers considers adequate distribution of the activating light between them. Moreover, spectral light that activates one layer may be harmful to another layer, thus an optimal sequence of layers may provide one activated layer to be the optical shielding filter for proceeding layers.

The present invention further concerns, but is not limited to, the production of windows, lenses, contact lenses, microlenses, mirrors and other optical articles. The present invention further relates to protecting dedicated optical elements against sun blinding, flash blinding, flash dazzling, flashing lights originating from explosions in battle fields, welding light, fire related blinding, and lenses for cameras that look directly at the sun or missile launching sites, and other bright emitting sources that contain ultra violet light in their spectrum.

BACKGROUND OF THE INVENTION

Photochromic materials are known and exhibit a change in light transmission or color in response to actinic radiation in the spectrum of sunlight. Removal of the incident radiation causes these materials to revert back to their original transmissive state. This phenomenon is known as a photochromic effect. In general, the same photochromic material present in different matrices will produce different colors, different activated intensities and different color activating and fading rates. Methods of using the photochromic effect in the prior art have the following characteristics and drawbacks:

Today, most spectacle lenses are made of a variety of plastics or plastic-glass composites. Most used plastics include PMMA (e.g., Plexiglas by Rohm and Haas, Perspex, Lucite, Altuglas and Optiks by Plaskolite,) and Polycarbonate (e.g., Lexan by General Electric, MERLON by Mobay Chemical Company, MAKROLON by Bayer, and PANLITE from Teijin Chemical Limited).

In one conventional method, a photochromic material is directly mixed with a matrix material, such as an eyeglass lens. Commonly used matrices for the eyeglass lens are allyl diglycol carbonate (CR-39), polycarbonate, and other polymers having high refractive indices. A disadvantage of this method is that it cannot be used where the matrix is not suitable for use as a carrier for the photochromic material. Even if the matrix can be a photochromic dye carrier, it may not be the best carrier to allow particular photochromics to achieve sufficiently fast rates of color change and color fading, a sufficient darkness, or satisfactory color.

To resolve the aforesaid drawback, the use of a coating process to form a photochromic layer on a surface of a lens was developed. Aside from allowing selection of a preferred matrix for the photochromic material, this technique simplifies the manufacturing process and lowers manufacturing costs of the coating layer. In addition to the above description of the photochromic activity, the original color prior to photochromic color change and the resulting color after color change are important factors that determine whether a photochromic article is acceptable in the market. In most cases, a single photochromic dye cannot ensure that after color transformation, its characteristics will be pleasant to the eye.

Some success in rendering plastic ophthalmic lenses photochromic involved embedding a solid layer of photochromic mineral glass within the bulk of an organic lens material. Examples include U.S. Pat. No. 5,232,637 (Dasher, et al.) that teaches a method of producing a glass-plastic laminated ophthalmic lens structure, and U.S. Pat. No. 4,300,821 (Mignen et al.) and U.S. Pat. No. 4,268,134 (Gulati et al.) that teach an ophthalmic lens made of organic material having at least one layer of photochromic mineral glass within its mass to impart photochromic properties to the lens.

Photochromic materials have applications such as sunglasses, graphics, ophthalmic lenses, solar control window films, security and authenticity labels, and many others. The use of photochromic materials, however, has been limited due to (a) degradation of the photochromic property of the materials (fatigue) as a result of continued exposure to UV light, particularly to the shorter and more energetic wavelengths, (b) low photochromic reaction where UV radiation is scarce or when the absorption band of the photochromic dye is narrow and is poorly overlapping with the available spectral part of the solar light. Some partial solution is proposed in U.S. Pat. No. 7,884,992 (Wang et al.), where layered structure of the same matrix and photochromic material using layers of different stoichiometry (different percentage mixtures of the same materials) are used. In this way one can expose to the incoming sunlight the low photochromic material concentration layer and absorb some UV before impinging on the high photochromic material concentration layer.

Photochromic materials are well known and exhibit a change in color, in addition to change in opacity, in response to radiation in the spectrum of sunlight. Many photochromic materials have some initial color or tint in their original transmissive state or in their darker condition. Some of the colors or tints are unpleasant to the human eye.

Common photochromic materials, such as Naphthopyrans and Spirooxazines, are strongly influenced by temperature. Higher temperatures usually lead to faster fade-back times, i.e. the bleaching process after the illumination by activating light has stopped is accelerated with the increase in temperature. Moreover, different dyes have different bleaching rates at room temperature. Essentially, a faster fade-back is usually preferred; however, it is inversely proportional to the amount of tint the material reaches. Since each dye has a different temperature in which its performance is optimized, a combination of different dyes, each in its own layer, may expand the material's working temperature.

Improving the photochromic materials' fatigue resistance, changing their color to be more "eye pleasing," enhancing their efficiency and expanding their working temperature are important concerns that this invention addresses and provides solutions for.

SUMMARY

In accordance with one embodiment, a layered photochromic composition comprises a plurality of layers of different photochromic materials, each of the layers having a unique activation spectral band that is different from the activation spectral band of the other layers to enhance the photochromic responsivity of the composition to impinging light, such as solar light. In one implementation, each of the layers includes a matrix material containing a photochromic dye. The matrix materials may be organic-based (e.g., polymer film, polymerizable compositions or transparent adhesives) or inorganic-based (e.g., mineral glass, sol-gel or other window based material, and an inorganic-organic composite. The photochromic dyes may include (1) at least one organic dye selected from the group consisting of pyrans, oxazines, fulgides, fulgimides, diarylethenes, in monomeric or polymeric ungelled solution or chemically bonded, and/or (2) at least one inorganic dye selected from the group consisting of crystallites of silver halides, cadmium halide and copper halide.

At least one of the layers on the light-receiving side of the layered photochromic composition may be more resilient than at least one of the layers on the light-exiting side of the layered photochromic composition, with the at least one layer on the light-exiting side of the layered photochromic composition being more sensitive to the received light than the more resilient layers.

A layered photochromic composition comprising a plurality of layers of different photochromic materials, each of the layers having a unique activation spectral band that is different from the activation spectral band of the other layers to enhance the photochromic responsivity of the composition to impinging light, and including a tinted layer for color correction.

One embodiment uses a layered photochromic matrix, where each layer contains a different photochromic material having a unique solar spectrum activation band. Enhanced activation is achieved by employing a wider spectral band via a plurality of photochromic materials with non- or partly-overlapping activation bands, which yields better efficiency of the activating solar light and thus faster and stronger tints of the layered structure than that achieved by a mono layer of only one component or many layers of the same component.

A further embodiment is the distribution of the activating light among the layers, which allows overcoming an inherent limitation in the efficiency of the photochromic materials' activation. In a single, thick layer, masking of activating light by the open state (tinted) molecules occurs. The latter absorb the activating light that otherwise would have activated other photochromic molecules hence reducing the light's penetration depth into the material. The layered composition where each layer contains photochromic materials having different activation bands, effectively enhances the light's penetration depth.

A further embodiment addresses the problem of degradation of the photochromic property of the materials (fatigue) as a result of continued exposure to UV light, particularly to the shorter and more energetic wavelengths. This is achieved by placing the more resilient layers in the front side (the first light-exposed layer) thus shielding the inner layers of more sensitive (to light exposure) materials.

The matrix in the photochromic compositions can be organic-based, e.g., a polymer film, a polymerizable composition, or a transparent adhesive, or inorganic-based, e.g., mineral glass, sol-gel, and any other window based material, and an inorganic-organic composite.

A further embodiment solves the problem of colors that are unpleasant to the human eye via combinations of layers of different colors or mixtures within, e.g., using a single or multi-layer photochromic composition described above and adding a semitransparent tinted layer in front of or behind the photochromic layer. This addition can change the integral tint of the integral layer structure into a neutral density (gray) tint or into a more eye-pleasing tint.

A further embodiment solves the problem of thermal response of different photochromic materials. Layers of different photochromic materials can perform better than a single layer, in a wide range of temperatures, where one material is more efficient in low temperatures and a second material is more efficient in high temperatures.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DETAILED DESCRIPTION OF THE DRAWINGS

Figure 1:
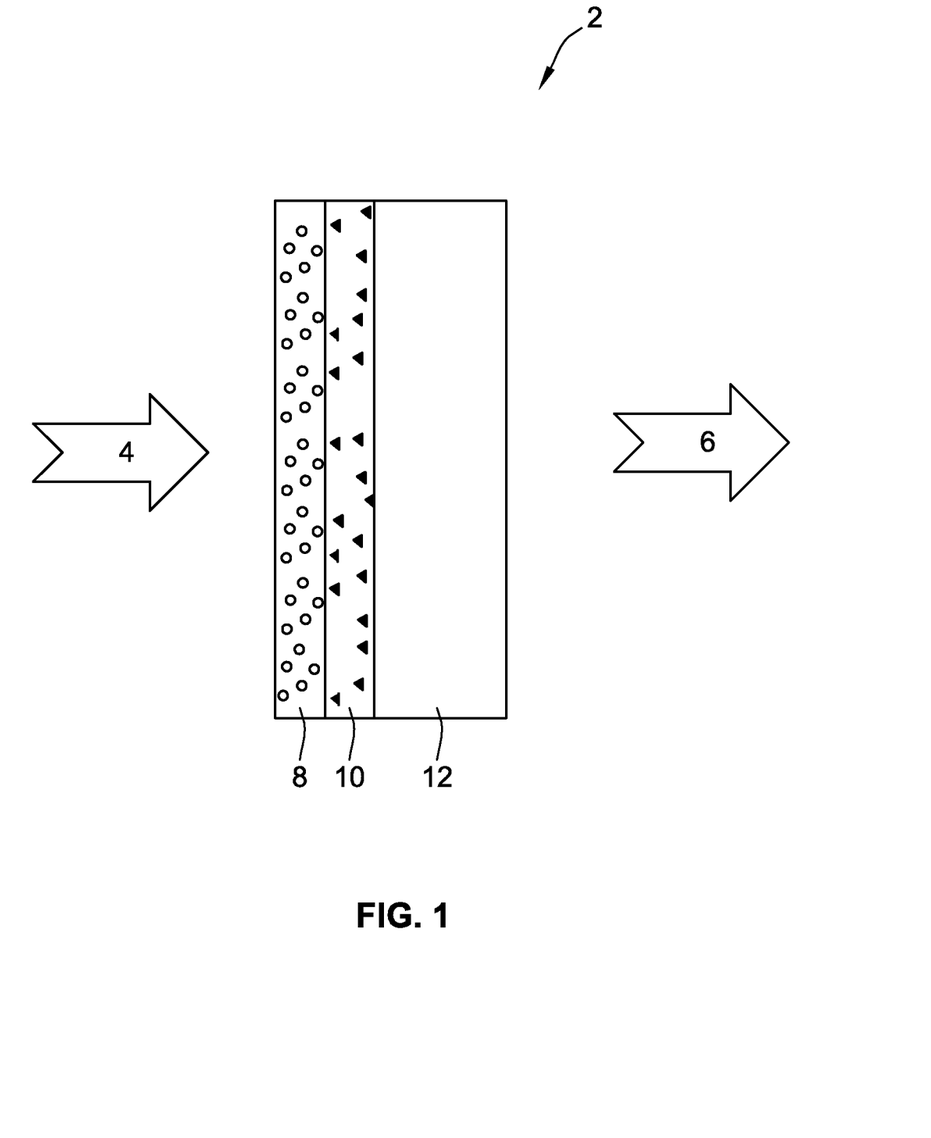
FIG. 1 is a cross-sectional view of a layered photochromic matrix composition having different materials in each layer.
Figure 3A:
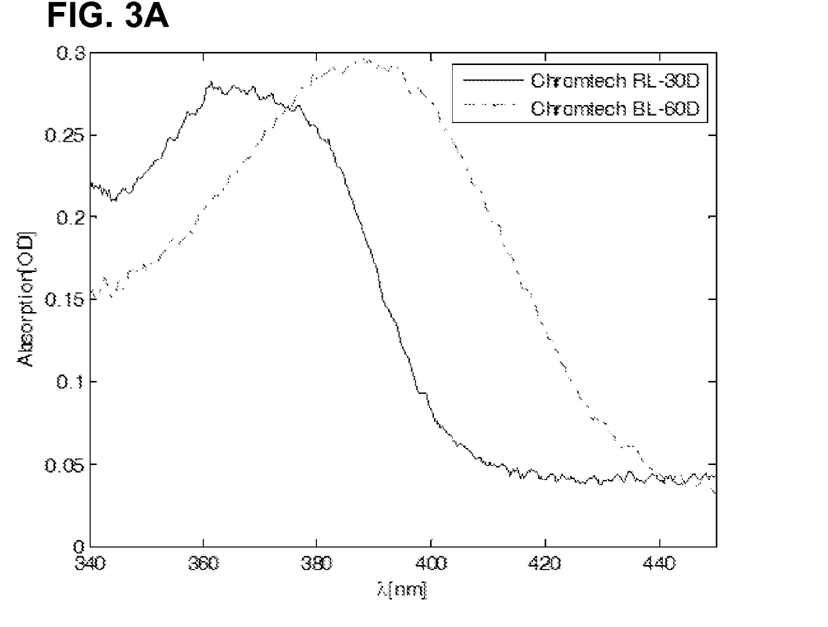
FIG. 3A shows activation spectra of two different photochromic dyes to be used in layers having partially overlapping activation bands.

FIG. 1 is a cross-sectional view of layered photochromic matrix composition 2, comprising a substrate material 12, a photochromic material layer 10 of, e.g., Chromtech BL60D (manufactured by Chromtech Ltd. Rehovot, Israel), absorbing mainly in the UV and short visible wavelengths (e.g. 380 to 420 nm) of light, and a second photochromic material layer 8 of, e.g., Chromtech RL30D, absorbing mainly in the UV wavelengths (e.g. 340 to 380 nm) of the solar light. Layers 8 and 10 are two of the plurality of layers used. The impinging sunlight 4 is partially absorbed first by layer 8, a portion of the remaining light is absorbed in layer 10, and then the remaining light passes through substrate material 12. In this way more of light 4 is absorbed (e.g., 340-420 nm wavelength) and tints the layered photochromic matrix composition 2 before leaving in direction 6. The absorption spectrum of layer 8 has non- or partial-overlapping activation bands with layer 10, one example of which is shown in FIG. 3*a*. Substrate 12 can be transparent glass or polymer, and layers 8 and 10 are polymeric matrices, having photochromic materials embedded therein.

Figure 2:
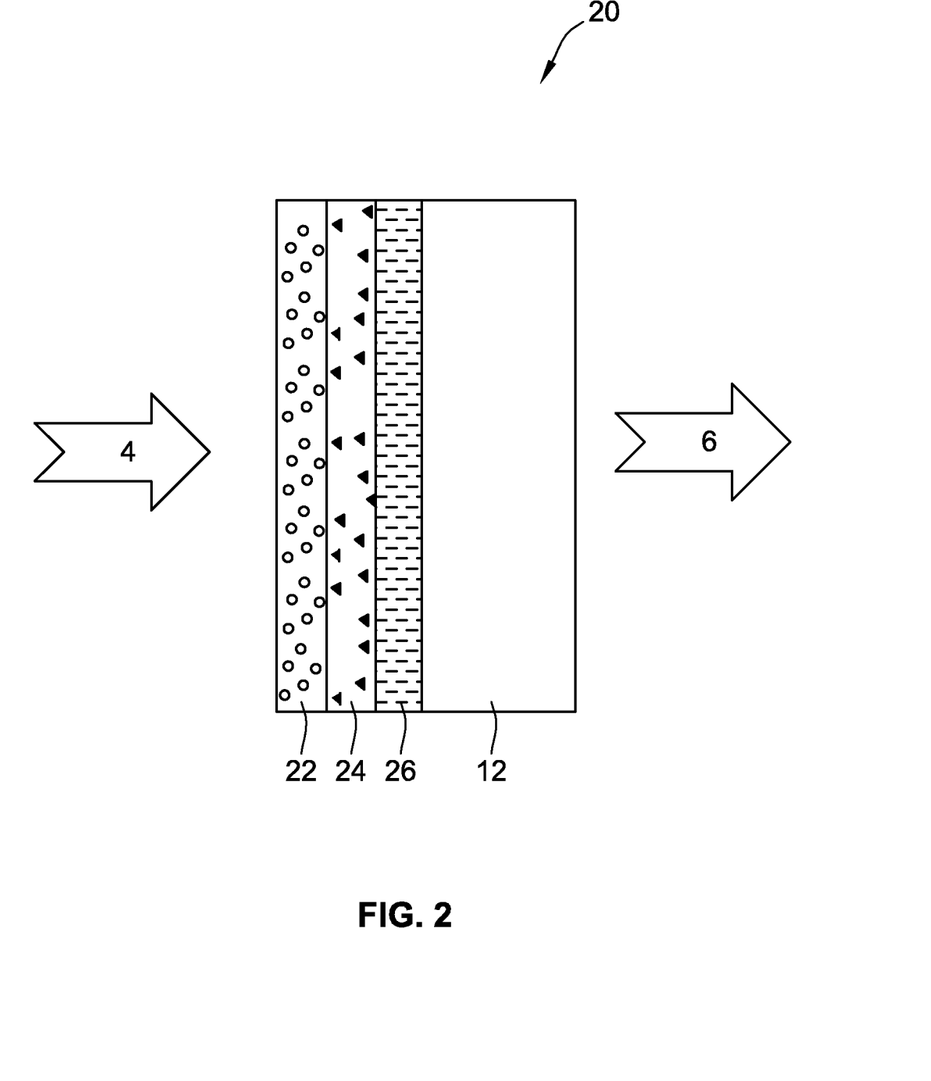
FIG. 2 is a cross-sectional view of a layered photochromic matrix composition where layers of sensitive photochromics are shielded by more resilient layers.

FIG. 2 shows a device 20, in cross-sectional view of different activation band photochromic layers 22, 24 and 26, leaving different activation spectral bands, on a substrate 12 where layers of vulnerable photochromic materials 24 and 26 are shielded by more resilient layers like layer 22. The UV-rich light 4 is filtered by layer 22, e.g., Chromtech RL30D, before reaching layers 24 and 26, thus holding the layers 24 and 26 less exposed to harmful UV radiation in light 4, thus prolonging the life time durability of layers 24 and 26. In this way more of light 4 is absorbed (e.g., 340-420 nm wavelength) and tints layered photochromic matrix 20 before leaving in direction 6.

FIG. 3A shows absorption spectra of 2 different photochromic materials in their non-activated state. These spectra indicate the activation spectral band of each material, i.e., the part of solar radiation that transforms it into its colored state. As can be seen in FIG. 3A, one photochromic material, Chromtech BL60D (dashed line) is absorbing mainly in the UV and short visible wavelengths (380 to 420 nm) of light. A second material, Chromtech RL30D (solid line) is absorbing mainly in the UV wavelengths (340 to 380 nm) of light. A combination of the two photochromic materials in two different sequential layers will be efficient in the 340 to 420 nm wavelength range.

Figure 3B:
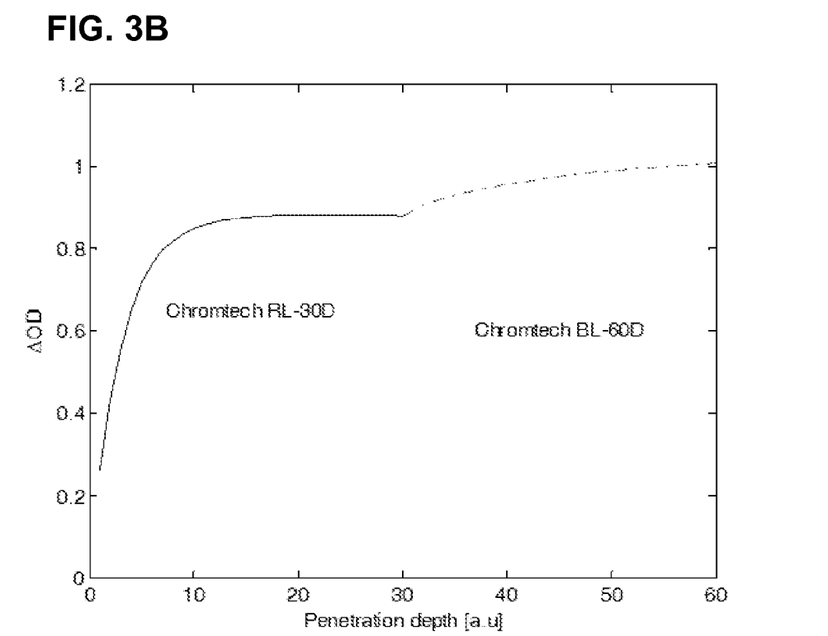
FIG. 3B shows the change in optical density ($\Delta OD$), between the activated and non-activated states, as a function of penetration depth of light into a layer composition of these two materials.

FIG. 3B presents the evolution of the two-layer composition's change in optical density ΔOD as a function of penetration depth. The light encounters first the layer containing Chromtech RL30D and ΔOD seems to increase as a function of the penetration depth until saturating at a value of ~0.9. Then the light encounters the second layer and ΔOD commences its increase until saturating again at a value of ~1. This value of ΔOD=1 could not be reached by a layer containing only one type of these photochromic materials, no matter what the layer's thickness be.

Figure 4:
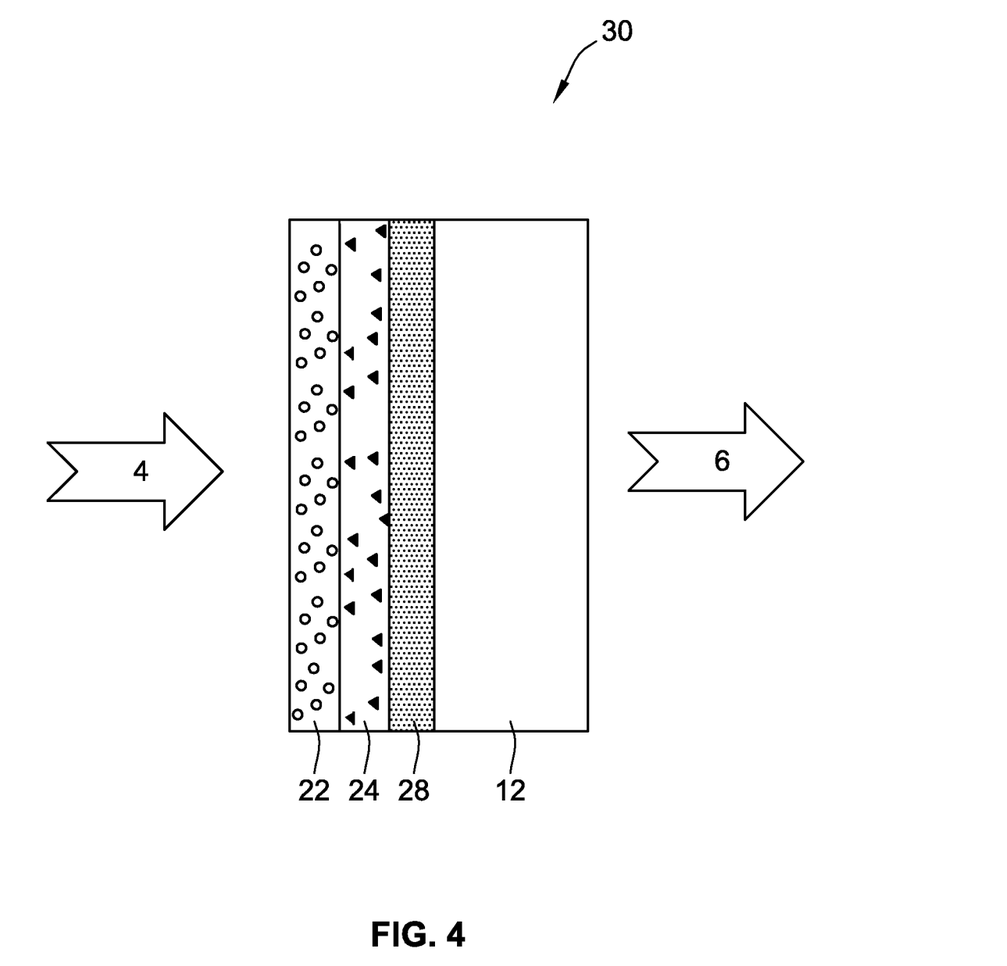
FIG. 4 is a cross-sectional view of a layered photochromic matrix composition where a layer of semitransparent colored layer is positioned in front or behind the photochromic layer, for color correction.

FIG. 4 is a cross-sectional view of a layered photochromic matrix composition 30 where a semitransparent, colored, layer 28, is placed in front of or behind the photochromic layers 22, 24, for color correction. The added layer 28 has a permanent color and does not change at UV or visible light exposure. The combined color of the photochromic layers 22, 24 and the semitransparent colored layer 28 can be made to be neutral color (gray) or shaded as desired, as depicted in FIGS. 5A-5D.

Figure 5A:
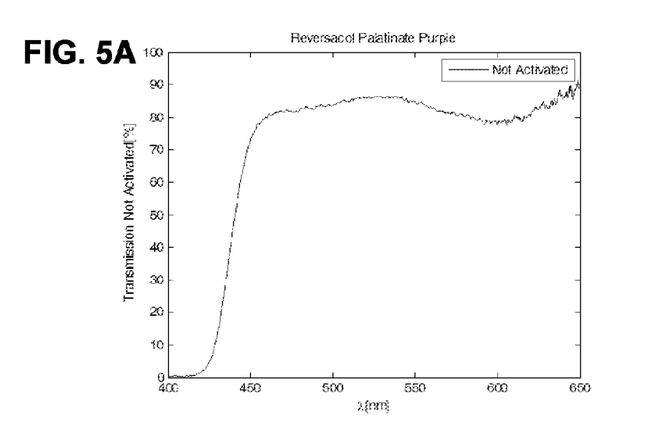
FIG. 5A is a transmission spectrum of a non-activated Reversacol Palatinate Purple photochromic material.
Figure 5B:
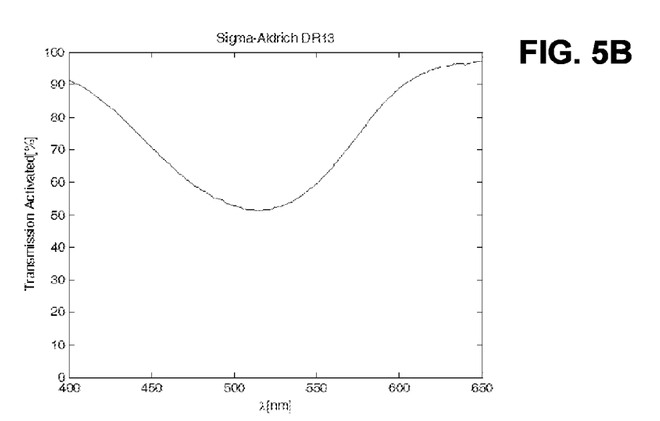
FIG. 5B is a transmission spectrum of a permanently reddish Sigma-Aldrich DR13 semitransparent colored material.
Figure 5C:
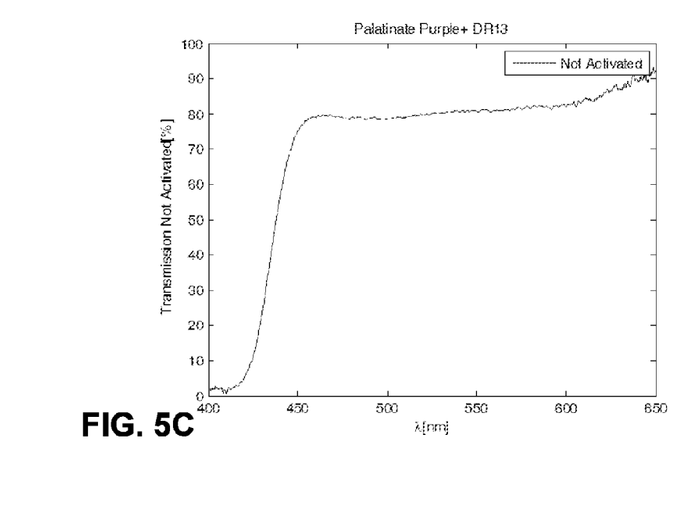
FIG. 5C is a transmission spectrum of a non-activated two-layer structure in which one layer is the Reversacol Palatinate Purple photochromic material and the second layer is the permanently reddish Sigma-Aldrich DR13 semitransparent colored material.
Figure 5D:
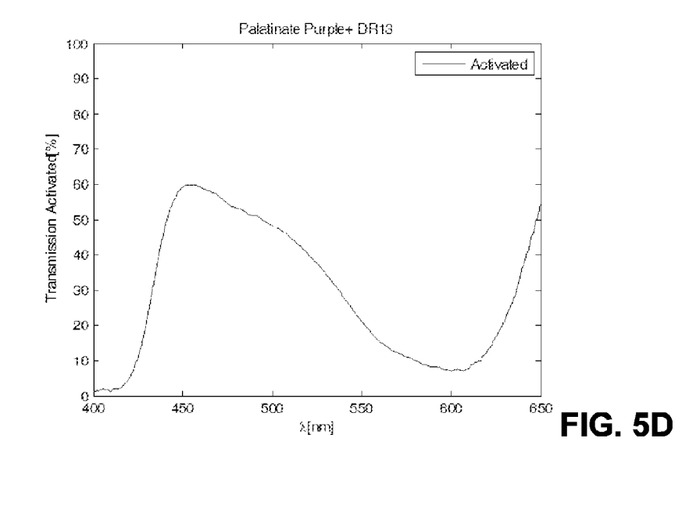
FIG. 5D is a transmission spectrum of an activated two-layer structure in which one layer is the Reversacol Palatinate Purple photochromic material and the second layer is the permanently reddish Sigma-Aldrich DR13 semitransparent colored material.

FIGS. 5A-5D are examples showing color correction procedure. It depicts transmission spectra of a non-activated photochromic material (a), a semitransparent colored material (b) and a combined layered structure of the two in the non-activated (c) and activated (d) states. The photochromic material is, e.g., Reversacol Palatinate Purple (manufactured by Vivimed Labs Europe Ltd.), which has maximal transmission at ~530 nm in the non-activated state (see FIG. 5A), making it appear greenish. By adding a layer of, e.g., a permanently reddish material DR13 (made by Sigma Aldrich Co, LLC), having a transmission spectrum shown in FIG. 5B, the output light passing through the two layers comes out as neutral color, as shown in FIG. 5C. It is clear that the output transmission in FIG. 5C is "flat" in the visible spectrum (e.g., 450 to 650 nm), making it optically neutral or a gray color. FIG. 5D shows the transmission spectrum of the composition in the activated photochromic state. In this state the addition of the permanent color does not seem to have any significant influence the overall perceived color.

Figure 6:
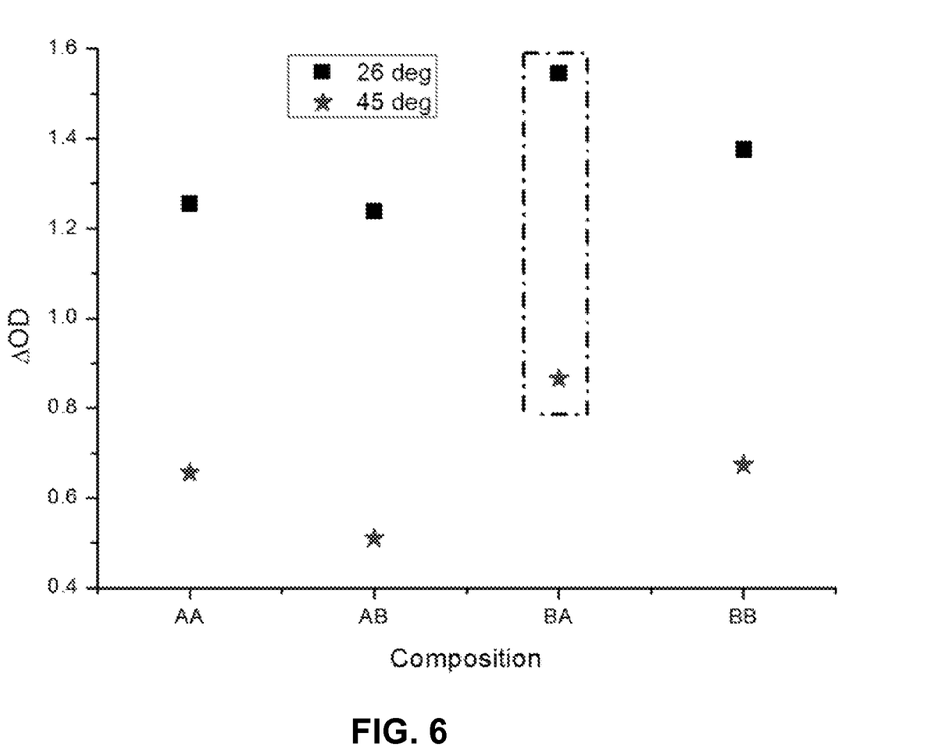
FIG. 6 shows the change in optical density (DOD) for permutations of two layers, each containing a single photochromic material, in a photochromic composition structure at two distinctive temperatures: 26° C. and 45° C.

FIG. 6 shows the change in optical density ΔOD of a two layer structure as a function of layer composition at two temperatures: 26° C. and 45° C. Composites A and B are layers containing photochromic materials of the Spirooxazine and Naphthopyran type, respectively. Four compositions are tested for optimal change in optical density ΔOD in both room and high temperatures. Two of the compositions, AA and BB, are constructed from only one type of photochromic material, while the other two are mixtures that differ only by the order of layers, AB and BA. An advantage for a specific composition BA (B facing the impinging light) is evident, showing a higher value of ΔOD over the other compositions at both temperatures.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A layered photochromic composition for providing protection from impinging solar light that includes ultraviolet light, said composition comprising first and second layers of photochromic material, the first layer receiving said solar light and the second layer receiving light from the first layer, said first layer having an outer surface receiving said solar light and an inner surface facing said second layer, said first layer containing a first photochromic material that is reversibly activated by impinging ultraviolet light having wavelengths within a first activation spectral band, and said second layer having a first surface facing the inner surface of said first layer and a second surface facing away from said first layer, said second layer containing a second photochromic material that is reversibly activated by ultraviolet light received from said first layer and having wavelengths within a second activation spectral band that is non-overlapping or only partially overlapping with said first activation spectral band, said second photochromic material being more susceptible to fatigue from exposure to ultraviolet light than said first photochromic material, wherein the absorption of ultraviolet light by said first layer reduces the amount of ultraviolet light that reaches said second layer.

2. The layered photochromic composition of claim 1 in which each of said layers includes a matrix material containing a photochromic dye.

3. The layered photochromic composition of claim 1 in which each of said photochromic materials comprises at least one organic material selected from the group consisting of pyrans, oxazines, fulgides, fulgimides, diarylethenes, in monomeric or polymeric ungelled solution or chemically bonded.

4. The layered photochromic composition of claim 1 in which each of said photochromic materials comprises at least one inorganic material selected from the group consisting of crystallites of silver halides, cadmium halide and copper halide.

5. The layered photochromic composition of claim 2 in which the matrix materials are organic-based: polymer film, polymerizable compositions, transparent adhesives, or inorganic-based: mineral glass, sol-gel, other window based material, and an inorganic-organic composite.

6. The layered photochromic composition of claim 1 in which each of said layers has a temperature response that is different from the temperature response of the other layers.

7. The layered photochromic composition of claim 1 which includes a tinted layer for color correction.

8. A method of providing protection from impinging solar light using a layered photochromic material, said method comprising
   receiving the solar light in a first layer having an outer surface receiving the solar light and containing a first photochromic material that is reversibly activated by impinging ultraviolet light having wavelengths within a first activation spectral band,
   receiving the light that is transmitted through said first layer in a second layer containing a second photochromic material that is reversibly activated by ultraviolet light received from said first layer and having wavelengths within a second activation spectral band that is non-overlapping or only partially overlapping with said first activation spectral band, said second photochromic material being more susceptible to fatigue from exposure to ultraviolet light than said first photochromic material,
   wherein the absorption of ultraviolet light by said first layer reduces the amount of ultraviolet light that reaches said second layer.

9. The method of claim 8 in which each of said layers includes a matrix material containing a photochromic dye.

10. The method of claim 8 in which each of said photochromic materials comprises at least one organic material selected from the group consisting of pyrans, oxazines, fulgides, fulgimides, diarylethenes, in monomeric or polymeric ungelled solution or chemically bonded.

11. The method of claim 8 in which each of said photochromic materials comprises at least one inorganic material selected from the group consisting of crystallites of silver halides, cadmium halide and copper halide.

12. The method of claim 9 in which the matrix materials are organic-based: polymer film, polymerizable compositions, transparent adhesives, or inorganic-based: mineral glass, sol-gel, other window based material, and an inorganic-organic composite.

13. The method of claim 8 in which each of said layers has a temperature response that is different from the temperature response of the other layers.

14. The method of claim 8 which includes a tinted layer for color correction.

\* \* \* \* \*